No. 728,569. PATENTED MAY 19, 1903.
L. HACHENBERG.
WEIGHING MACHINE.
APPLICATION FILED JULY 30, 1902.
NO MODEL. 7 SHEETS—SHEET 1.

Fig.1.

Witnesses:
F. J. Hachenberg.
E. Everett Ellis

Inventor:
Louis Hachenberg.
By his Attorney.
F. H. Richards.

No. 728,569. PATENTED MAY 19, 1903.
L. HACHENBERG.
WEIGHING MACHINE.
APPLICATION FILED JULY 30, 1902.
NO MODEL. 7 SHEETS—SHEET 2.

Fig. 2.

Witnesses:
F. J. Hachenberg
E. Everett Ellis

Inventor:
Louis Hachenberg.
By his Attorney.
F. H. Richards.

No. 728,569. PATENTED MAY 19, 1903.
L. HACHENBERG.
WEIGHING MACHINE.
APPLICATION FILED JULY 30, 1902.

NO MODEL. 7 SHEETS—SHEET 4.

Fig.4.

Witnesses:
F. G. Hachenberg.
E. Everett Ellis

Inventor:
Louis Hachenberg.
By his Attorney.
F. H. Richards.

No. 728,569. PATENTED MAY 19, 1903.
L. HACHENBERG.
WEIGHING MACHINE.
APPLICATION FILED JULY 30, 1902.
NO MODEL. 7 SHEETS—SHEET 5.

Witnesses:
F. G. Hachenberg.
E. Everett Ellis

Inventor:
Louis Hachenberg.
By his Attorney.
F. H. Richards.

No. 728,569. PATENTED MAY 19, 1903.
L. HACHENBERG.
WEIGHING MACHINE.
APPLICATION FILED JULY 30, 1902.
NO MODEL. 7 SHEETS—SHEET 6.

Witnesses:

Inventor:
Louis Hachenberg.
By his Attorney

No. 728,569. PATENTED MAY 19, 1903.
L. HACHENBERG.
WEIGHING MACHINE.
APPLICATION FILED JULY 30, 1902.
NO MODEL. 7 SHEETS—SHEET 7.

Witnesses:
F. G. Hachenberg
E. Everett Ellis

Inventor:
Louis Hachenberg.
By his Attorney.
F. H. Richards.

No. 728,569. Patented May 19, 1903.

UNITED STATES PATENT OFFICE.

LOUIS HACHENBERG, OF NEW YORK, N. Y.

WEIGHING-MACHINE.

SPECIFICATION forming part of Letters Patent No. 728,569, dated May 19, 1903.

Application filed July 30, 1902. Serial No. 117,596. (No model.)

*To all whom it may concern:*

Be it known that I, LOUIS HACHENBERG, a citizen of the United States, residing in New York, in the county of New York and State of New York, have invented certain new and useful Improvements in Weighing-Machines, of which the following is a specification.

This invention relates to weighing-machines; and it consists substantially in the improvements hereinafter particularly described.

The invention has reference more especially to weighing-machines of that type in which are embodied a movable beam and a balancing device thereon and in which the adjustments of the balancing device are effected through the instrumentality of independently-operated hand mechanism mounted in suitable position on the machine.

Though applicable to other purposes, my improvements are intended more especially for use in establishments wherein articles or commodities are weighed and sold at retail; and one of the principal objects of my invention is to provide a weighing-machine of the character referred to with means for visually indicating to the salesman and purchaser of an article both the weight of the article and the selling price thereof and also to provide suitable means whereby on the proper registry of the weight and price of an article a check or ticket may be caused to be delivered or ejected from the machine, having printed thereon the price of the article.

A further object of the invention is to provide the machine with means whereby an accurate account or registry may be kept of the total number of sales-tickets caused to be delivered by the machine in a given time and also to provide a weighing-machine embodying the general characteristics named which is comparatively simple in its construction and organization and which is thoroughly effective and reliable in use or operation.

The above and additional objects are attained by means substantially such as are illustrated in the accompanying drawings, in which—

Fig. 6 is a view in elevation of the combined check printing and delivery mechanisms looking at the same from the opposite end of the machine from which Fig. 5 is taken.

Before proceeding with a more detailed description it may be stated that I may employ any suitable scale mechanism in connection with my present improvements; but preferably I have herein illustrated a scale mechanism substantially such as constitutes one of the embodiments referred to in the Letters Patent No. 669,083, granted me on the 5th day of March, 1901, and comprising in the main a scale-beam having two members, each member having a poise or poises thereon and one of them adapted to be employed as a tare-beam, if desired. In the present instance the scale-beam is properly fulcrumed in a suitable supporting structure for the machine, and operating in connection with the scale-beam are parallel-motion devices movably supporting a frame on which in turn is supported a platform or table for holding or receiving an article to be weighed. The scale-beam and parallel-motion devices are in movable connection of course, and when an article to be weighed is placed upon the platform or table the scale-beam is thrown out of balance, and to restore such balance suitable means are employed for moving the poise or poises the proper distance along the beam. In connection with the scale mechanism I employ mechanisms for visually indicating both the weight and selling price of an article to be sold, said latter mechanisms being simultaneously operated from the same means which actuate the devices which effect the movements of the poise or poises along the scale-beam to balance the article. Accordingly as the selling price of an article or commodity may vary per pound, for instance, it is essential that a corresponding variation be effected in the relative movements of the weight and price indicating mechanisms, and for this purpose I employ devices of special construction and organization which are adapted to be adjusted or set at will by the operator. Other adjunctive features of my present improvements will more fully appear hereinafter.

Specific reference being had to the accompanying drawings by the designating characters marked thereon, A represents a suitable base for the parts of the several mechanisms of the machine, and B represents an inclosing casing for said parts. Mounted upon the base and contained within the said inclosing casing is a frame or supporting structure C for the different parts, and fulcrumed on knife-edge bearings (indicated at $a$) is a connecting-brace $b$ for two members D D', constituting the scale-beam, said members being preferably provided with poises 1 2 and 3 4, respectively, and the latter one being capable of use as a tare-beam, as will appear. The said connecting-brace $b$ is formed or provided, preferably on opposite sides of its central point, with lugs or offsets $cc$, fitted in openings in which is a pin $d$, to which is loosely connected the lower end of a link $e$, having its upper end in movable connection with a pin $f$, fitted in openings in the bifurcated end of the member $g$ of a movable frame E, having knife-edge bearings, (indicated at $h$,) the said member $g$ having bearing-links $i$ at the sides, in which are supported the knife-edge projections $k$ on the members $l$ of an additional movable frame E', having knife-edge bearings, (indicated at $m$,) the said movable frames E and E' constituting the parallel-motion devices for the scale mechanism. Supported upon knife-edge bearings $n$ on the said movable frames E E' is a horizontal frame F, on which is held a platform or table $o$ for receiving an article to be weighed, and the construction and organization of the parts of the scale mechanism thus far described are such that the weight of an article placed on said platform or table serves to tilt the scale-beam on its fulcrum in an obvious manner. The poises of each member of the scale-beam are preferably connected to move together by means of a movable rack G, located on the upper edge of the member, said poises being notched at $g^2$ to ride upon the members, as shown, to thereby evenly guide the racks as the latter are operated to be moved. Inasmuch as there is a certain conjoint operation of the scale mechanism and the several indicator mechanisms about to be described, the devices for operating the said racks G will be hereinafter referred to in connection with other parts, it being mentioned at this point that the member D of the scale-beam is provided with a counterbalance or adjusting device H at one end to compensate for any inaccuracy produced in the scale mechanism due to inequality of level of support for the base or from other similar causes.

Secured to the base A and extending practically for the whole length of the machine are two parallel plates $ff$, arranged a suitable distance apart, so as to form a slideway for a slide $u$, which is adapted to be moved back and forth longitudinally of the machine, as will appear, and which slide is provided on its upper edge or surface with a rack $v$, the teeth of which are engaged by the teeth of a gear-wheel $w$, which receives its motion from another gear-wheel $x$, mounted on a transverse shaft J, having its bearings in vertical supports $y$ and $z$, the said gear-wheel being mounted to turn on a stud or pin $z^2$, secured in said support $y$, and the said shaft having at its outer end a handle or grip $j$ to be taken hold of for operating the rack $v$ in the manner and for the purpose hereinafter described. Secured to the said rack $v$ at $v^a$ is a carriage 5, formed or provided with a guide or slideway 7 for the vertically-reciprocating movements of a slide 8, said guide being strengthened by a side brace 9, secured to the upper part thereof at 10 10 and to the carriage at 11. Passing through said slide near its lower end is a pin or other axial member 12, on which is mounted a block 13, capable of turning, and likewise passing through the side is another pin or axial member 14, on which is mounted a similar block 15, also capable of turning, the ends of said pins being provided with disks or similar means 16 for maintaining the slide in place in said guide. The said block 13 fits closely between the upper and lower sides of a longitudinal slot 17, formed in a lever 18, having its inner end fulcrumed or pivoted at 19 and its outer end free, as shown, (see Fig. 2,) and the said block 15 similarly fits between the upper and lower sides of a longitudinal slot 20, formed in another lever 21, the outer end of which is fulcrumed or pivoted at 22 between the upright portions $22^a$ of a stanchion $22^b$, and the inner end of which is free and carries a vertical rack-bar 23, the teeth of which engage the teeth of a pinion or gear-wheel $23^a$, mounted on a transverse shaft 24, supported by a hanger 25 on a cross-brace 26 between side portions of the framework of the machine, the rack-bar being pivoted at its lower end, as indicated at 27, between the lower extremities of guide-plates 28 therefor pendent from the sides of the said free end of the said pivoted lever 21, and said rack-bar being held to its work by a spring 29 bearing thereagainst at the ends, said spring being secured to the end of said lever 21, as shown. The shaft 24 is also provided with a somewhat larger gear-wheel 30, the teeth of which engage the teeth of the rack member D of the scale-beam, and said shaft is provided for a part of its length with a sleeve 31, on which is mounted a similar gear-wheel 32, the teeth of which engage the teeth of the rack of the member D' of said scale-beam, the said sleeve being provided at its forward end with a crank 33, having a handle 34 and provided with an indicating hand or pointer 35, working over the divisions $34^a$ of a dial or scale-disk M, properly secured in stationary position, the corresponding end of said shaft 24 being also provided with an indicating hand or pointer 36, working over the divisions $34^b$ of said dial or scale-disk, as shown. Pivoted at its lower end to a pendent projection at the free end or extremity of lever 18 is a rack-bar 37, the teeth of which are engaged by the teeth of a pinion or gear-wheel 38, said rack-bar being held to such engagement by means of an antifriction-roller 39, supported by and turning on a stud or pin 40, projecting from the side of a bracket 42, which is secured to one of the said upright portions $22^a$ of the said stanchion $22^b$. (See Fig. 2.) The said pinion or gear-wheel 38 is carried by the inner end of a transverse shaft 41, which has its bearings in the portions 43, 44, and 45 of a horizontal frame $M^2$, which is supported by standards 46 and 47, secured to the base of the machine, the outer portion of said shaft 41 also passing through an opening therefor in the framework of the machine at 48 (see Fig. 4) and provided at the end thereof with an indicating hand or pointer 49 for working over the divisions 50 of a dial or scale-disk N, secured in stationary position on the framework of the machine in any suitable manner. Fitted on the shaft 41 to turn therewith is an enlarged beveled gear-wheel 52, and also fitted on said shaft to turn independently thereof is a sleeve 53, provided at its inner end with a small beveled pinion 54, and at its outer end with an indicating hand or pointer 55 for moving upon or around the divisions 56 of the said dial or scale-disk N. The dial or scale-disk M is for indicating the weight of an article placed on the scale platform or table to be weighed, and the dial or scale-disk N is for indicating the selling price of the article, both of said dials or scale-disks being again referred to hereinafter.

The beveled gear-wheel 52 on shaft 41 is engaged by a beveled pinion 57, carried by a main operating-shaft S, extending longitudinally of the machine and having its bearings at one end in the portions 58 and 59 of the horizontal frame $M^2$ and at the other end in standards or uprights 60 and 61, secured to the base of the machine, and the beveled pinion 54 on sleeve 53 is engaged by a similar beveled pinion 62, carried at the end of said shaft S. (See Figs. 2 and 4.) The divisions $34^b$ of the dial or scale-disk M denote pounds and fractions thereof of the article to be weighed, while the divisions 56 of dial or scale-disk N denote from one to a hundred cents of the selling price of the article, the divisions 50 of said latter dial or scale-disk denoting from one to ten dollars of money value, and it will be seen that the sizes of the operating-gearing for the said indicating hands or pointers 49 and 55 are so proportioned that for each one hundred cents registered by the hand or pointer 55 the hand or pointer 49 will be moved or turned to indicate one dollar, and so on, according to the weight and selling price of the article.

Figure 1:
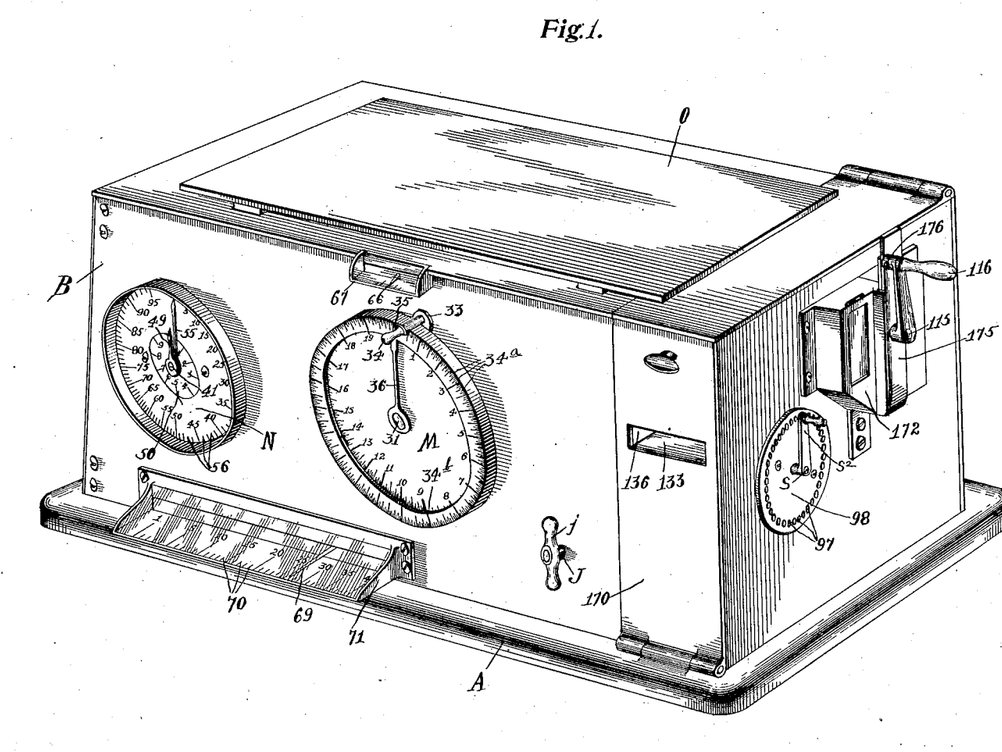
Figure 1 is a perspective view of my improved weighing-machine as it appears when constructed and organized for use.
Figure 2:
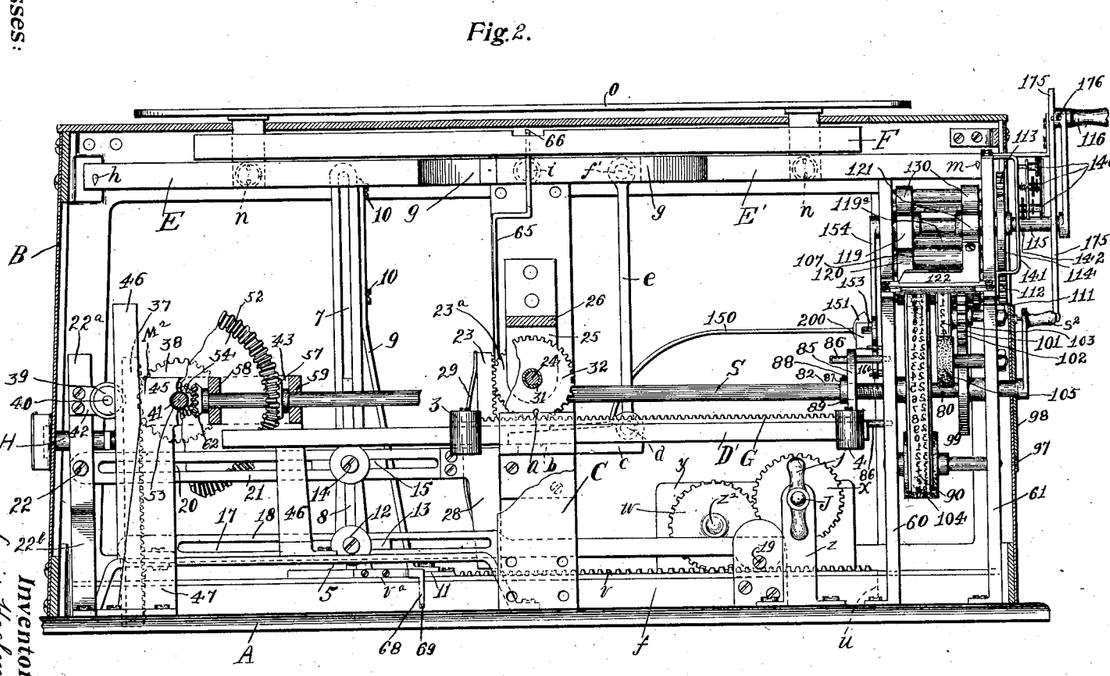
Fig. 2 is a vertical longitudinal sectional view of the machine looking at the same from the front and taken about on the line $x\,x$ of Fig. 4.
Figure 3:
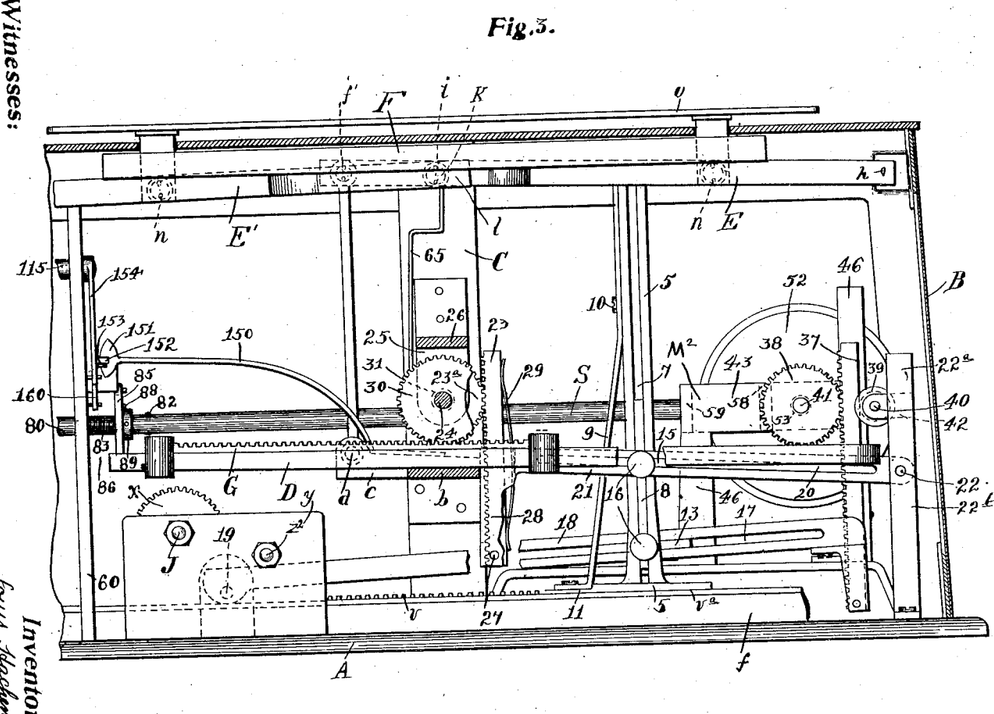
Fig. 3 is substantially a similar view to the preceding figure, taken from the rear of the machine.

Attached or secured to the connecting-brace $b$, between the members D and D' of the scale-beam, is an upwardly-extending arm 65, provided with an indicating hand or pointer 66, which works across the divisions of a scale 67, attached to the front of the machine at the upper part thereof, said hand or pointer indicating zero of said scale when the parts of the scale mechanism are in their normal positions, and secured to the base of the carriage 5 is a forwardly-projecting arm 68, provided at its forward end with an indicating hand or pointer 69, moving or working over the divisions of a scale 70, formed on a plate 71, secured to the projecting portion of the base of the machine at the front, as indicated in Fig. 1. The said scale 70 denotes the pound value in money of an article being weighed, and accordingly as such value may vary from time to time or with different articles the said hand or pointer 69 is moved to the desired value or division of said scale 70 by simply turning the shaft J, and thereby moving the carriage 5 the proper distance through engagement of rack $v$ by the gear-wheel $w$. When the hand or pointer 69 is operated to be moved to indicate the lowest value—say one cent—on the scale 70, the carriage 5 will be at or near the free end of lever 18 or at the farthest point from the fulcrum of said lever, and at the same time the said carriage will be at or near the fulcrum of lever 21 or at the farthest point from the free end of the same, the said levers being normally substantially horizontal and parallel with each other. Assuming that the selling price of an article to be weighed is five cents a pound, the lever J is first operated to move the carriage 5 until the hand or pointer 69 indicates the five-cents value on the scale 70, and this movement of the carriage regulates the sweep or movement of the said levers 18 and 21 when the same are operated to move the devices which actuate the several indicating hands or pointers referred to. The article is now placed on the platform or table of the scale mechanism, and the scale-beam is of course tilted or overbalanced, the hand or pointer 66 being at the same time moved out of registry with zero of scale 67, due to the fact that the said hand or pointer is practically a part of the arm 65 on connecting-brace b of the said scale-beam, as already explained. The main operating-shaft S is now taken hold of by its handle S² and turned until the hand or pointer 66 again registers zero of scale 67, and during this time the hand or pointer 36 of dial or disk M is moved over the divisions of scale 34ᵇ to the ten-pound point, the hand or pointer 55 being also moved simultaneously therewith to indicate fifty cents (the selling price of the article being weighed) at the proper division of scale 56 on the dial or disk N. Thus both the weight and selling price of the article being weighed are indicated to the salesman and customer, and on removing the article from the scales the shaft S is operated in the reverse direction to restore the several parts to the positions they first occupied. As shown in Figs. 1 and 2, the hand or pointer 69 indicates the selling price of any article to be twenty-five cents per pound, and thus if an article weighing ten pounds was placed on the scale-platform and shaft S operated, as described, the hand or pointer 36 would immediately turn to the ten-pound point of scale 34ᵇ on dial or disk M, and at the same time both the hands or pointers 55 and 49 of dial or disk N would be turned to indicate two dollars and fifty cents, as is apparent. In Fig. 3 the levers 18 and 21 are shown in the position they occupy after being operated from shaft J to counterbalance an article of some given weight placed on the scales to be weighed, and in Fig. 1 said levers are shown in their normal position or prior to being operated for the purpose and in the manner just mentioned. In operating the member D' of the scale-beam as a tare-beam a receptacle to be filled—such as a box, for instance—is placed upon the scale-platform and the weight thereof first ascertained by moving the hand or pointer 35 over the divisions of scale 34ᵃ until the hand or pointer again registers zero of scale 67, whereupon said box may be filled with any commodity to be sold, after which the weight and selling price of the commodity are ascertained by proceeding in the manner as hereinbefore explained when weighing an article directly. Inasmuch as the sweep or movement of the levers 18 and 21 is of gradually-increasing extent toward the free ends or extremities thereof, it follows that when the carriage 5 is operated to carry the hand or pointer 69 to the lowest value represented on scale 70 (the slide 8 being thus carried to or near the free end of lever 18 or to the farthest point from the fulcrum of such lever) and the shaft S is operated to move the poise to counterbalance the weight of an article on the scales the said slide 8 is elevated its maximum height, due to the contiguity thereof to the fulcrum of lever 21. Conversely, when the carriage is operated to carry the said hand or pointer 69 to the lowest value on scale 70 (the slide 8 being now moved to or near to the free end of lever 21 or to the farthest point from the fulcrum of said lever) and said shaft S is operated as before the said slide will be elevated only a limited height, due to the contiguity of the same to the fulcrum of said lever 18. Hence it will be seen that the necessary movements of said levers required to actuate the weight and price indicating devices of an article being weighed are governed or regulated entirely by the longitudinal position of the slide 8, said slide rising and falling in its guide 7 with the rising and falling movements of lever 18, due to the connection of block 13, fitting in the slot of said lever, and the said lever 21 being caused to rise and fall with lever 18, due to the connection formed between this latter lever and the slide 8 by the block 15.

It is thought the operation of the several mechanisms described will be fully understood, and it is apparent, of course, that I am not limited to the construction and organization of said mechanisms in the precise details herein pointed out, since departures therefrom may be resorted to in practice and still be within the scope of my invention. For instance, instead of locating the scale platform or table at the upper part of the machine I may suspend the same in a position beneath the machine, and other similarly immaterial changes may also be resorted to without departing from the general character and purposes of the machine.

Figure 4:
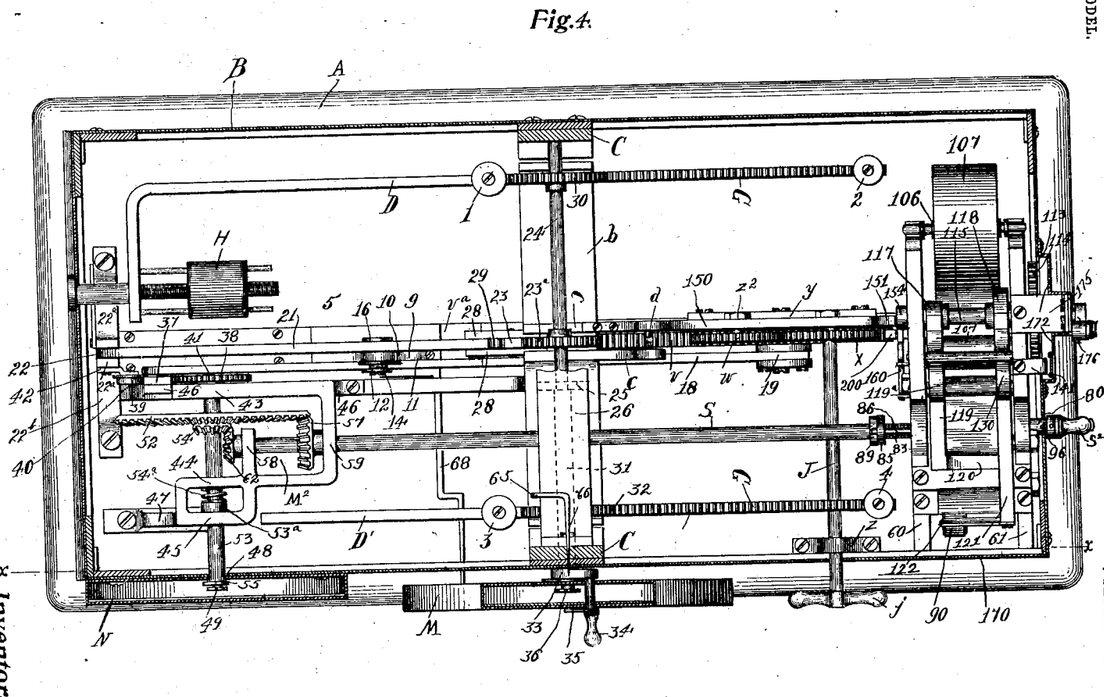
Fig. 4 is a sectional plan view of the machine, taken in a plane beneath the scale-platform and its supporting-frame and other auxiliary parts.
Figure 5:
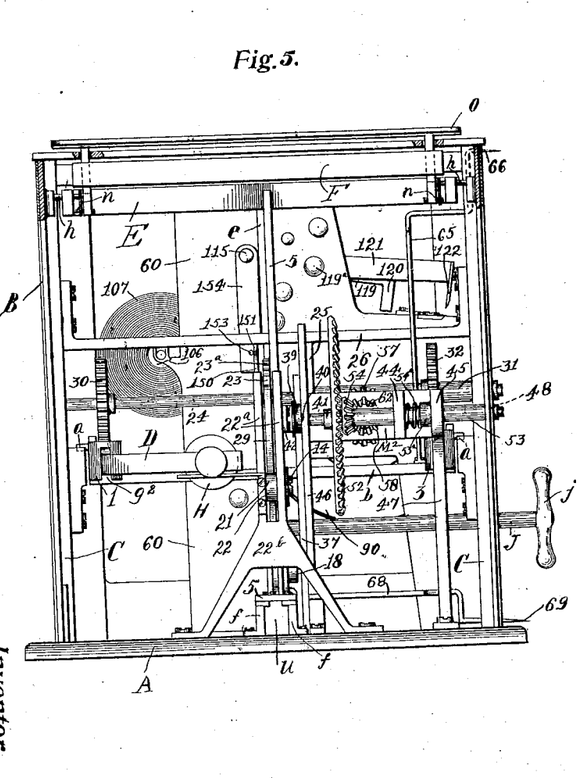
Fig. 5 is a view in elevation looking at the machine from one end and indicating the base and inclosing casing thereof in section.

Referring back to the geared connection between shaft S and the sleeve 53 on transverse shaft 41, it may be stated that I prefer that the beveled pinion 54 be held in yielding engagement with the beveled pinion 62 and to effect which I preferably provide the said sleeve with a collar 53ᵃ, bearing against the inner side of part 45 of frame M², and attached to which collar is one end of a spring 54ᵃ, the other end of which bears against the inner side of part 44 of said frame with a yielding pressure, all as clearly indicated in Figs. 4 and 5.

Figure 10:
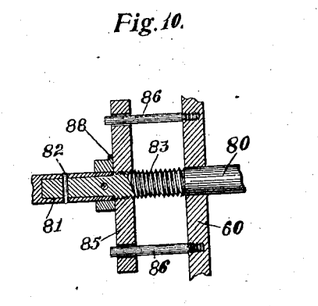
Fig. 10 is a detail view indicating more clearly a preferred construction employed for the shaft through the medium of which the several mechanisms of the machine are actuated.
Figure 11:
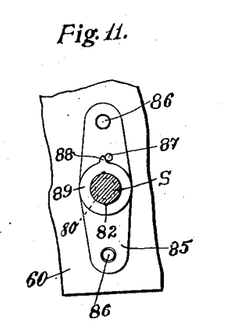
Fig. 11 is also a detail view in part section.

As thus far set out or described my improved machine is complete in itself, the several mechanisms thereof being thoroughly effective in the performance of their respective functions; but preferably I employ in connection therewith a combined printing and delivery mechanism for a check or ticket in representation of the selling price of each article weighed and sold and also an ordinary mechanism for accurately registering the total number of printed checks or tickets which may be caused to be delivered or ejected from the machine in a given time—as, for instance, a certain number of business hours. For the purpose of enabling the said check printing and delivery mechanisms to be readily detached from the machine when desired without having to disorganize any of the parts of the weighing or indicating mechanisms herein described I preferably form the section 80 of shaft S separate from the main portion thereof, and I make the adjacent end of said main portion hollow for a suitable distance, as indicated at 81, Fig. 10, the inner end of said section 80 being inserted in the end of said main portion and the parts being rigidly secured together by means of a pin 82, as shown. The said detachable shaft-section 80 is screw-threaded externally for a suitable distance, as shown at 83, and said screw-threaded portion works in a similarly-threaded opening in a slide 85, which is capable of movement back and forth on suitable supporting guide-pins 86 therefor accordingly as the said shaft S is turned or rotated in one direction or the other. The inner face of said reciprocatable slide is provided at a suitable point with a stop pin or projection 87, which is engaged by a tooth 88 of a collar 89 on shaft S when the said shaft is turned or rotated backwardly to a position corresponding to the position of the zero or "0" type on the cents type-wheel 90 of the printing mechanism, and thus the type-wheel cannot be carried backwardly past such position. The said type-wheel is mounted on the section 80 of said shaft intermediate the standards 60 and 61, and whenever the shaft and wheel are turned or rotated, or to the right in Fig. 1, the said slide 85 is caused to move outwardly on the threaded section 83 of the shaft, and then when the shaft and wheel are again turned back the said slide moves inwardly and is engaged or arrested, as set forth. The number of type on the type-wheel 90 corresponds with the divisions of the scale 56 on the dial or scale-disk N, and the handle $S^2$ of shaft S is provided with a spring 95, having a pin 96, which engages in holes or openings 97, formed near the edge of a circular plate or disk 98, secured in position at the corresponding end of the machine, the number and position of said holes corresponding with the number and position of the type on the type-wheel 90, and thus may the shaft be locked in any position to which it may be turned by causing the said pin 96 to enter some one of the holes or openings 97, it being understood that the said holes or openings are concentric with the said shaft S. Also carried by the section 80 of shaft S between said standards 60 and 61 is a disk 99, having at a suitable point of its periphery a tooth 100, which on each complete revolution of the cents or units type-wheel 90 engages one of the teeth 101 of a wheel 102, carried on a small stub-shaft projecting inwardly from standard 61, the said wheel 102 being practically integral or rigid with a smaller type-wheel 103, having type thereon denoting dollars and corresponding to the divisions of scale 50 of dial or scale-disk N. The type on type-wheel 90 are supplied with ink from a suitable inking-roller 104 therefor, and the type-wheel 103 is supplied with ink from a similar inking-roller 105.

Figures 7, 8:
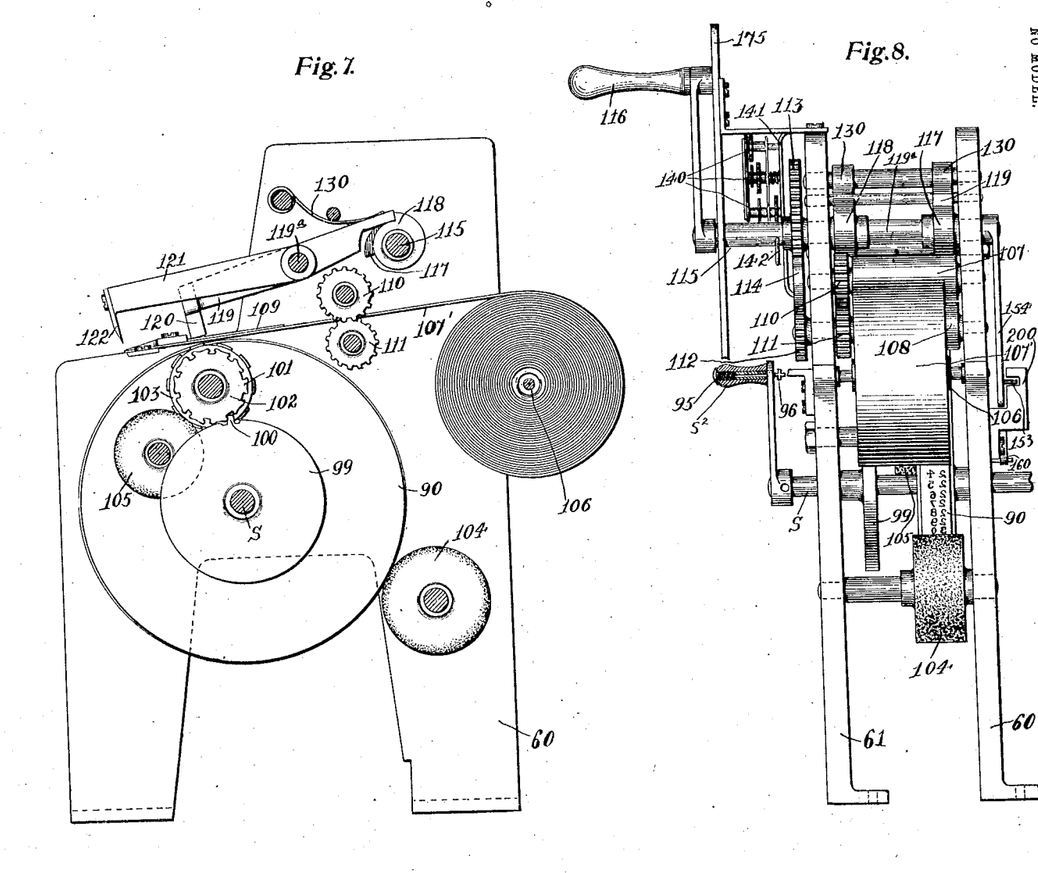
Fig. 7 is an enlarged end view in detail of the combined check printing and delivery mechanisms minus the outer support for the parts of such mechanisms, some of said parts being shown in section.
Fig. 8 is a rear elevation of the combined check printing and delivery mechanisms as they appear on removal of the inclosing casing of the machine.

Supported on a roller or reel 106 is a continuous check or ticket strip 107', the end of which passes between intermittent feed-rolls 107 and 108, to and over the type on the type-wheels 90 and 103, beneath a guide-plate 109, said feed-rolls being geared together by wheels 110 and 111, and the shaft of roll 108 having on the outer end thereof a gear-wheel 112, the teeth of which are periodically engaged by the teeth 113 of a mutilated gear-wheel 114, mounted on the corresponding or outer end of an actuating-shaft 115, having an operating crank or handle 116. The said shaft 115 is provided with two cams 117 and 118, out of line with each other, as shown in Fig. 7, the one cam 117 working against the under side of the inner end of a lever 119, fulcrumed on a shaft $119^a$ and having at its forward end an impression device 120 for pressing the check or ticket strip 107' against the type on the type-wheels, and the other cam 118 similarly working against the under side of the inner end of a lever 121, also fulcrumed on said shaft $119^a$ and having at its forward end a knife or cutting device 122 for severing or cutting the checks or tickets from the said strip 107'. After the shafts J and S are operated to determine the proper indications on dials or scale-disks M and N the shaft 115 is then operated by its crank or handle, and during the rotations of said shaft the impression device 120 is forced down upon the check or ticket strip by the action of cam 117 on the end of lever 119, by which to print the selling price of the article on the under side of said strip. Succeeding this operation the feed-rolls are operated to feed said strip forward the distance of one check or ticket, and it should be mentioned that the inner ends of said levers 119 and 121 are constantly acted upon by the inner ends of springs 130 to hold both the impression device and the cutting device normally in elevated positions, and thus as the highest point of cam 117 passes from beneath the end of said lever 119 the impression device is again elevated. Immediately succeeding the elevation of said impression device the cam 118 acts upon the inner end of lever 121 in like manner, so as to depress the cutting device 121 to sever the printed check or ticket from the strip, after which said cutting device is also again elevated, as is apparent, the construction and organization of the several devices referred to being simple and effective. The said cutting device works through a space 132, formed between the edge of guide-plate 109 and the inner edge of an inwardly and upwardly inclined shelf 133, leading from the check or ticket discharge opening 136. (See Fig. 1.)

Figure 6:
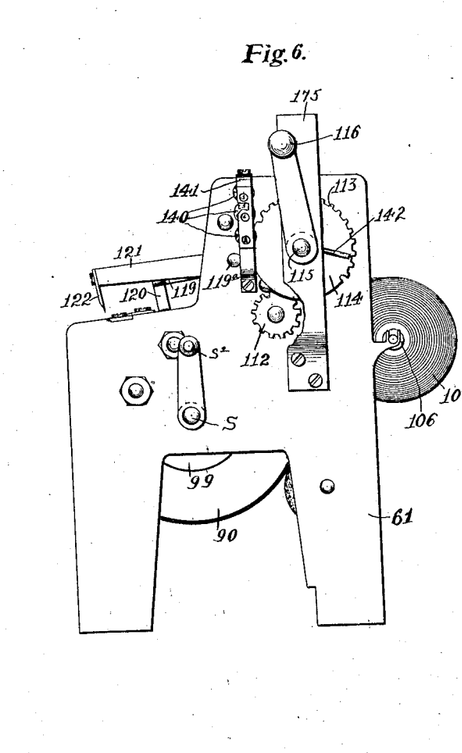

In connection with the check or ticket printing and delivery mechanism described I also prefer to employ a device for registering the number of checks or tickets ejected from the machine, such device comprising a plurality of adding-wheels 140, mounted in a frame 141, secured in position on the outer side of standard or upright 61, the said wheels being actuated from a tappet 142 on shaft 115. (See Figs. 6 and 8.) The said register device is of ordinary construction and operation and may not be more specifically referred to.

To prevent the ticket printing and delivering mechanisms from being operated except on counterbalance between the article being weighed and the scale-beam, I secure, preferably to one of the lugs $c$ of connecting-brace $b$ of said beam, one end of an arm or member 150, the free end of which is in proximity to the inner side of standard or upright 60 of the machine-frame, the said free end of said arm or member being provided with a vertically-disposed plate 151, having therein a notch 152, which notch when the scale-beam and article being weighed are counterbalanced permits passage therethrough of a pin 153 on the end of a crank or arm 154, which is carried by the inner end of shaft 115. When the scale-beam is out of balance, however, the said plate 151 is in a position to encounter such pin, and consequently the shaft 115 cannot be turned or rotated far enough to effectively operate the parts or mechanisms actuated thereby. The said crank or arm 154 is carried past a spring 160 in the forward movements of shaft 115, the said spring serving to restore the said arm to its normal position in the event of attempt being made to effect the printing of a check or ticket when the scale-beam is out of balance. Also to prevent binding or distortion of the notched plate 151 by the said pin 153 on any attempt to operate the printing mechanism when the scale-beam is out of balance I employ a stationary block or resisting device 200, against which the side of said plate will be carried by impingement of the said pin 153 against the latter, the said block thereby receiving the force of the strain and preserving the shape of the plate.

The check or ticket shelf 133 is formed on the inner side of a hinged door 170 at the front of the machine, (see Fig. 1,) and it will also be observed in said figure that the adding or register devices are inclosed by a suitable casing 172, the outer end of shaft 115 being supported by a bracket 175. The crank or handle 116 of said shaft may or may not be provided with a small catch 176, engaging an edge of said bracket to prevent turning of the shaft until such engagement is released by the thumb or finger of the operator, said catch also having the function of engaging an edge of bracket 175 to thus prevent the operating-shaft of the printing device from being turned more than a single revolution each time the same is operated.

As before stated, I am not limited to the precise details of construction and organization of the parts or elements of the several mechanisms herein illustrated.

Figure 9:
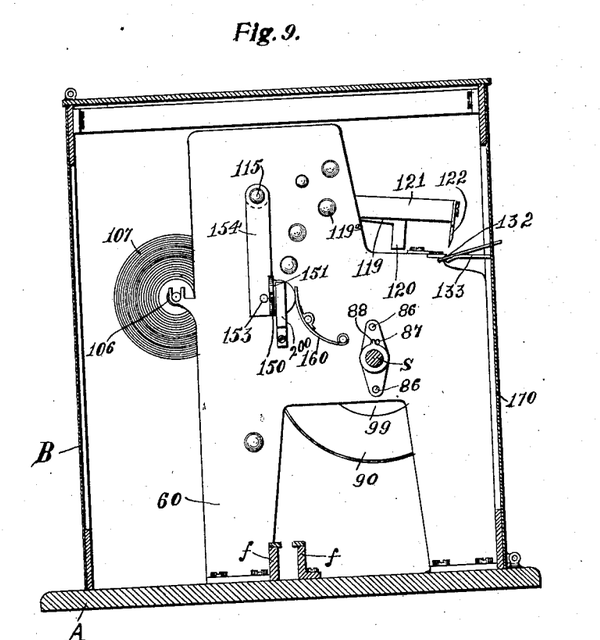
Fig. 9 is an end view of the combined check printing and delivery mechanisms looking at the same from the right in Fig. 8.

In virtue of the special relation existing between the adjacent edges of the guide-plate 9 and the check or ticket shelf 133 the check or ticket is tilted upwardly by the force of descent of the cutting device in such manner as to remain in the position indicated at Fig. 9 until taken hold of and removed by the hand of the operator. This is an advantage, in that the tickets as they are severed from the strip are not liable to slip out of place, as might otherwise happen at times under some circumstances.

Having described my invention, I claim—

1. A weighing-machine comprising a scale-beam and a balancing device thereon, indicator mechanisms for indicating the weight and selling price of an article weighed on the machine, means whereby the operation of said mechanisms may be varied in accordance with variations of the market value of the article, and means for actuating the mechanisms by adjusting the balancing device on the beam, said latter means being in part constituted of reversely-fulcrumed levers geared to said mechanisms.

2. A weighing-machine comprising a scale-beam and a balancing device thereon, a mechanism for indicating the weight of an article weighed on the machine, and means for actuating said mechanism by adjusting the balancing device on the beam, said means including reversely-fulcrumed slotted levers, a movable carriage, and movable connections between said levers and the carriage.

3. A weighing-machine comprising a scale-beam and a balancing device thereon, a mechanism for indicating the selling price of an article weighed on the machine, and means for actuating said mechanism by adjusting the balancing device on the beam, said means including reversely-fulcrumed slotted levers, a movable carriage, and movable connections between said levers and the carriage.

4. A weighing-machine comprising a scale-beam and a balancing device thereon, mechanisms for indicating both the selling price and weight of an article weighed on the machine, and means for simultaneously actuating said mechanisms by adjusting the balancing device on the beam, said means including reversely-fulcrumed slotted levers, a movable carriage, and movable connections between said levers and the carriage.

5. A weighing-machine comprising a scale-beam and a balancing device thereon, a mechanism for indicating the weight of an article weighed on the machine, means for actuating said mechanism by adjusting the balancing device on the beam, combined printing and delivery mechanisms for a sale-ticket, and coöperative connections between the latter mechanisms and the mechanism first named, said means including reversely-fulcrumed slotted levers, a movable carriage, and movable connections between said levers and the carriage.

6. A weighing-machine comprising a scale-beam and a balancing device thereon, a mechanism for indicating the selling price of an article weighed on the machine, means for actuating said mechanism by adjusting the balancing device on the beam, combined printing and delivery mechanisms for a sale-ticket, and coöperative connections between the latter mechanisms and the mechanism first named, said means including reversely-fulcrumed slotted levers, a movable carriage, and movable connections between said levers and the carriage.

7. A weighing-machine comprising a scale-beam and a balancing device thereon, mechanisms for indicating both the weight and selling price of an article weighed on the machine, means for actuating said mechanisms by adjusting the balancing device on the beam, combined printing and delivery mechanisms for a sale-ticket, and coöperative connections between said latter mechanisms and the mechanisms first named, said means including reversely-fulcrumed slotted levers, a movable carriage, and movable connections between said levers and the carriage.

8. A weighing-machine comprising a scale-beam and a balancing device thereon, a mechanism for indicating the weight of an article weighed on the machine, means for actuating said mechanism by adjusting the balancing device on the beam, combined printing and delivery mechanisms for a sale-ticket, devices for registering each printed ticket delivered from the machine, and coöperative connections between said latter mechanisms and the mechanism first named, said means including reversely-fulcrumed slotted levers, a movable carriage, and movable connections between said levers and the carriage.

9. A weighing-machine comprising a scale-beam and a balancing device thereon, a mechanism for indicating the selling price of an article weighed on the machine, means for actuating said mechanism by adjusting the balancing device on the beam, combined printing and delivery mechanisms for a sale-ticket, devices for registering each printed ticket delivered from the machine, and coöperative connections between said latter mechanisms and the mechanism first named, said means including reversely-fulcrumed slotted levers, a movable carriage, and movable connections between said levers and the carriage.

10. A weighing-machine comprising a scale-beam and a balancing device thereon, indicator mechanisms for indicating the selling price and weight of an article weighed on the machine, means for simultaneously actuating said mechanisms by adjusting the balancing device on the beam, combined printing and delivery mechanisms for a sale-ticket, and devices for registering each printed ticket delivered from the machine, said means being in part constituted of reversely-fulcrumed levers geared to said indicator mechanisms.

11. A weighing-machine comprising a scale-beam with a balancing device thereon, an indicator mechanism for indicating the selling price of an article weighed on the machine, means whereby the operation of the mechanism may be varied in accordance with variations in the market value of the article, means for actuating said mechanism by adjusting the balancing device on the beam, combined printing and delivery mechanisms for a sale-ticket, and devices for registering each printed ticket delivered from the machine, said last-named means being in part constituted of reversely-fulcrumed levers geared to the indicator mechanism.

12. A weighing-machine comprising a scale-beam and a balancing device thereon, indicator mechanisms for indicating the weight and selling price of an article weighed on the machine, means whereby the operation of said mechanisms may be varied in accordance with variations of the market value of the article, means for actuating the mechanisms by adjusting the balancing device on the beam, combined printing and delivery mechanisms for a sale-ticket, and devices for registering each printed ticket delivered from the machine, said last-named means being in part constituted of reversely-fulcrumed levers geared to said indicator mechanisms.

13. A weighing-machine comprising a scale-beam with a balancing device thereon, an indicator mechanism for indicating the weight of an article weighed on the machine, means for actuating said mechanism by adjusting the balancing device on the beam, combined printing and delivery mechanisms for a sale-ticket, and means on the beam operating to prevent said latter mechanisms from being actuated until the counterbalancing-point of said beam is reached.

14. A weighing-machine comprising a scale-beam with a balancing device thereon, an indicator mechanism for indicating the selling price of an article weighed on the machine, means for actuating said mechanism by adjusting the balancing device on the beam, combined printing and delivery mechanisms for a sale-ticket, and means on the beam operating to prevent said latter mechanisms from being actuated until the counterbalancing-point of said beam is reached.

15. A weighing-machine comprising a scale-beam with a balancing device thereon, indicator mechanisms for indicating the selling price and weight of an article weighed on the machine, means for simultaneously actuating said mechanisms by adjusting the balancing device on the beam, combined printing and delivery mechanisms for a sale-ticket, and means on the beam operating to prevent said latter mechanisms from being actuated until the counterbalancing-point of said beam is reached.

16. A weighing-machine comprising a scale-beam with a balancing device thereon, an indicator mechanism for indicating the selling price of an article weighed on the machine, means whereby the operation of the indicator mechanism may be varied in accordance with variations in the market value of the article, means for actuating said mechanism by adjusting the balancing device on the beam, combined printing and delivery mechanisms for a sale-ticket, and means on the beam operating to prevent said latter mechanisms from being actuated until the counterbalancing-point of said beam is reached.

17. A weighing-machine comprising a scale-beam and a balancing device thereon, indicator mechanisms for indicating the weight and selling price of an article weighed on the machine, means whereby the operation of said mechanisms may be varied in accordance with variations in the market value of the article, means for actuating said mechanisms by adjusting the balancing device on the beam, combined printing and delivery mechanisms for a sale-ticket, and means on the beam operating to prevent said latter mechanisms from being actuated until the counterbalancing-point of said beam is reached.

18. A weighing-machine comprising a scale-beam with a balancing device thereon, an indicator mechanism for indicating the weight of an article, means for actuating said mechanism by adjusting the balancing device on the beam, combined printing and delivery mechanisms for a sale-ticket, said mechanisms including a rotary shaft carrying an arm provided with a pin, and an arm on the beam having a notched plate operating to obstruct the movement of said pin until the counterbalancing-point of said beam is reached.

19. A weighing-machine comprising a scale-beam and a balancing device thereon, an indicator mechanism for indicating the selling price of an article, means for actuating said mechanism by adjusting the balancing device on the beam, combined printing and delivery mechanisms for a sale-ticket, said mechanisms including a rotary shaft carrying an arm provided with a pin, and an arm on the beam having a notched plate operating to obstruct the movement of said pin until the counterbalancing-point of said beam is reached.

20. A weighing-machine comprising a scale-beam and a balancing device thereon, indicator mechanisms for indicating the selling price and weight of an article, means for simultaneously actuating said mechanisms by adjusting the balancing device on the beam, combined printing and delivery mechanisms for a sale-ticket, said last-named mechanisms including a rotary shaft carrying an arm provided with a pin, and an arm on the beam provided with a plate having a notch and obstructing the turning movement of the pin until the counterbalancing-point of said beam is reached.

21. A weighing-machine comprising a scale-beam and a balancing device thereon, an indicator mechanism for indicating the selling price of an article weighed on the machine, means whereby the operation of the indicator mechanism may be varied in accordance with variations in the market value of the article, means for actuating said mechanism by adjusting the balancing device on the beam, combined printing and delivery mechanisms for a sale-ticket, said last-named mechanisms including a rotary shaft carrying an arm provided with a pin, and an arm on the beam provided with a plate having a notch and obstructing the turning movement of the pin until the counterbalancing-point of said beam is reached.

22. A weighing-machine comprising a scale-beam with a balancing device thereon, indicator mechanisms for indicating the weight and selling price of an article weighed on the machine, means whereby the operation of said mechanisms may be varied in accordance with variations in the market value of the article, means for actuating said mechanisms by adjusting the balancing device on the beam, combined printing and delivery mechanisms for a sale-ticket, said last-named mechanisms including a rotary shaft carrying an arm provided with a pin, and an arm on the beam provided with a plate having a notch and obstructing the turning movement of the pin until the counterbalancing-point of said beam is reached.

23. A weighing-machine comprising a scale-beam with a balancing device thereon, indicator mechanisms for indicating the selling price and weight of an article weighed on the machine, and means for actuating said mechanisms by adjusting the balancing device on the beam, said means being in part constituted of reversely-fulcrumed levers geared to said mechanisms.

24. A weighing-machine comprising a scale-beam with a balancing device thereon, indicator mechanisms for indicating the selling price and weight of an article weighed on the machine, means whereby the operation of said mechanisms may be varied in accordance with the variations in the market value of the article, means for actuating said mechanisms by adjusting the balancing device on the beam, a scale for denoting the point at which to set the mechanisms, and an indicating hand or pointer for moving over said scale, said actuating means being in part constituted of reversely-fulcrumed levers geared to the indicator mechanisms.

25. A weighing-machine provided with a scale-beam having a balancing device thereon, indicator mechanisms for indicating the selling price and weight of an article weighed on the machine, and means for simultaneously actuating said mechanisms and counterbalancing the beam, said means comprising reversely-fulcrumed normally horizontal levers respectively geared with said mechanisms, a carriage adapted to be moved to different points intermediate the fulcra of the levers, and connections on the carriage between the levers whereby movement imparted to one lever is communicated to the other.

26. A weighing-machine provided with a scale-beam having a balancing device thereon, indicator mechanisms for indicating the selling price and weight of an article weighed on the machine, and means for simultaneously actuating said mechanisms and counterbalancing the beam, said means comprising reversely-fulcrumed normally horizontal slotted levers respectively geared with said mechanisms, a carriage adapted to be moved to different points intermediate the fulcra of the levers and provided with a vertical guide, a slide vertically movable in said guide, and movable blocks attached to the slide and working in the slots of the levers.

27. A weighing-machine provided with a scale-beam having a balancing device thereon, indicator mechanisms for indicating the selling price and weight of an article weighed on the machine, and means for simultaneously actuating said mechanisms and counterbalancing the beam, said means comprising reversely-fulcrumed normally horizontal levers respectively geared with said mechanisms, a carriage adapted to be moved to different points intermediate the fulcra of the levers, and connections on the carriage between the levers whereby movement imparted to one lever is communicated to the other; a scale for denoting the point to which to move the carriage, and an indicating hand or pointer secured to the carriage and moving over said scale.

28. A weighing-machine provided with a scale-beam having a balancing device thereon, indicator mechanisms for indicating the selling price and weight of an article weighed on the machine, and means for simultaneously actuating said mechanisms and counterbalancing the beam, said means comprising reversely-fulcrumed normally horizontal slotted levers respectively geared with said mechanisms, a carriage adapted to be moved to different points intermediate the fulcra of the levers and provided with a vertical guide, a slide vertically movable in said guide, and movable blocks attached to the slide and working in the slots of the levers; a scale for denoting the point to which to move the carriage, and an indicating hand or pointer secured to the carriage and moving over said scale.

29. A weighing-machine comprising a scale-beam with a balancing device thereon, indicator mechanisms for indicating the weight and selling price of an article weighed on the machine, means whereby the operation of said mechanisms may be varied in accordance with variations in the market value of the article, means for actuating the mechanisms by adjusting the balancing device on the beam, and an independent counterbalance indicator device, said last-named means being in part constituted of reversely-fulcrumed levers geared to said mechanisms.

30. A weighing-machine provided with a scale-beam having a balancing device thereon, indicator mechanisms for indicating the weight and selling price of an article weighed on the machine, means for simultaneously actuating said mechanisms and counterbalancing the beam, said means comprising reversely-fulcrumed levers respectively geared to said mechanisms, and a hand-operated shaft.

31. A weighing-machine provided with a scale-beam having a balancing device thereon, indicator mechanisms for indicating the weight and selling price of an article weighed on the machine, means for simultaneously actuating said mechanisms and counterbalancing the beam, said means comprising reversely-fulcrumed levers respectively geared to said mechanisms, and a hand-operated shaft, said shaft being constructed at one end with a detachable threaded section and a projection; and a reciprocatable slide working on said threaded section, and means adapted to engage said projection of the shaft to limit the rearward motion of said shaft.

32. A weighing-machine provided with a scale-beam having a balancing device thereon, indicator mechanisms for indicating the selling price and weight of an article weighed on the machine, and means for simultaneously actuating said mechanisms and counterbalancing the beam, said means comprising reversely-fulcrumed normally horizontal levers respectively geared with said mechanisms, a carriage adapted to be moved to different positions intermediate the fulcra of the levers, connections on the carriage and between the levers whereby the movement imparted to one lever is communicated to the other, and hand mechanism for operating said carriage.

LOUIS HACHENBERG.

Witnesses:
FRED. J. DOLE,
E. EVERETT ELLIS.